METZ & ROHRER.
Corn-Coverer.
No. 58,277                                                    Patented Sept. 25, 1866.
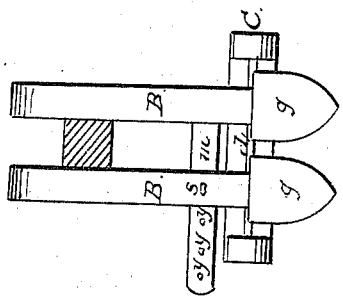
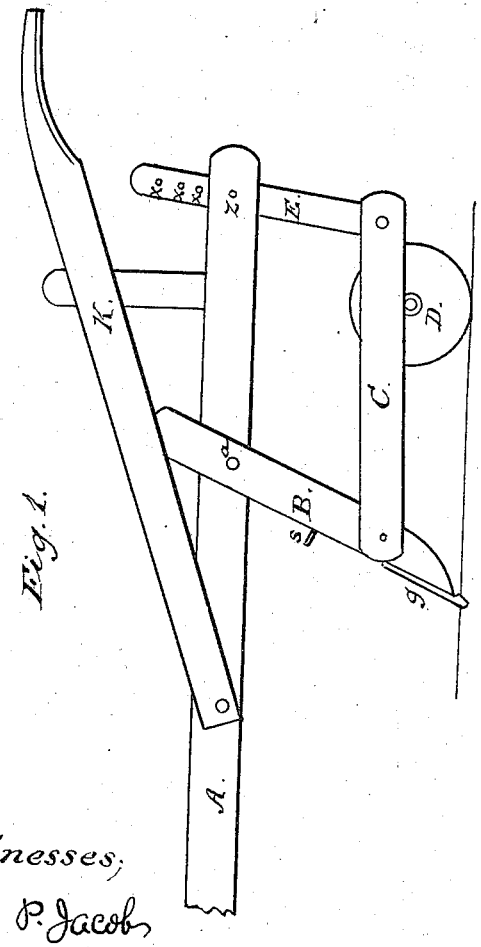
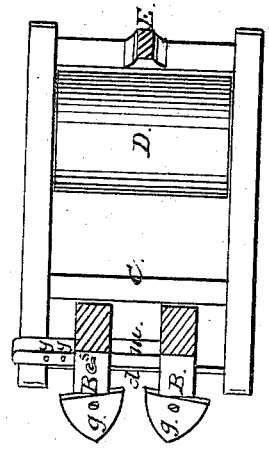
Witnesses:
John P. Jacobs
Charles Alexander
Inventor:
Saml. P. Metz
Martin Rohrer
per
Alexander & Mason
Attys.

UNITED STATES PATENT OFFICE.

S. P. METZ AND MARTIN ROHRER, OF McDONALDSVILLE, OHIO.

IMPROVEMENT IN CORN-PLANTERS.

Specification forming part of Letters Patent No. 58,277, dated September 25, 1866.

*To all whom it may concern:*

Be it known that we, SAML. P. METZ and MARTIN ROHRER, of McDonaldsville, Stark county, Ohio, have invented certain new and useful Improvements in Corn-Coverers; and do hereby declare that the following is a full, clear, and exact description of the same, reference being had to the accompanying drawings, and the letters of reference marked thereon, making a part of this specification.

In the annexed drawings, A represents the plow-beam, which is made in the ordinary way, and provided with suitable handles, $k$.

C represents a wooden frame, which is placed in a horizontal position near the ground, and connected to the beam A.

B B are two uprights, which connect the forward portion of the frame C to the beam A, and are provided with shovels $g\,g$ at their lower extremities.

$d$ is a metallic rod, which passes through both uprights B B directly above the shovels and attaches the said shovels and uprights to the frame C. Upon one of said uprights is secured a bar, $m$, which passes through a slot in the opposite upright, and is provided with a series of openings, $y\,y$, for the purpose of passing the pin $s$ through the upright and adjusting the shovels the required distance apart.

D represents the roller, which is secured in the frame C, and is elevated or lowered by the support E.

It will be seen that said support has openings $x$ at its upper end, and is connected to the rear end of the plow-beam A by a pin, $z$.

In the operation of this device the corn is dropped in the usual way, when the coverer is then drawn over the hills, the shovels turning the earth upon the corn, and the roller pressing down the loose clay.

The shovels can be made to enter the ground deep or shallow by elevating or lowering the support E, and the shovels $g\,g$ separated by the uprights B B, receding from each other upon the bar $d$ and connected by the pin and bar $m$.

Having thus fully described our invention, what we claim as new, and desire to secure by Letters Patent, is—

The upright B, frame C, and support E, with roller D, in combination with the plow-beam A, the whole being constructed and arranged as set forth.

As evidence that we claim the foregoing we have hereunto set our hands in the presence of two witnesses.

S. P. METZ.
MARTIN ROHRER.

Witnesses:
J. H. LIDDALL,
G. F. LEBEAU.